Sept. 20, 1938.　　　J. M. KNIGHT　　　2,130,767
RECLINING SEAT CONTROL MECHANISM
Filed Jan. 16, 1937　　　2 Sheets-Sheet 1
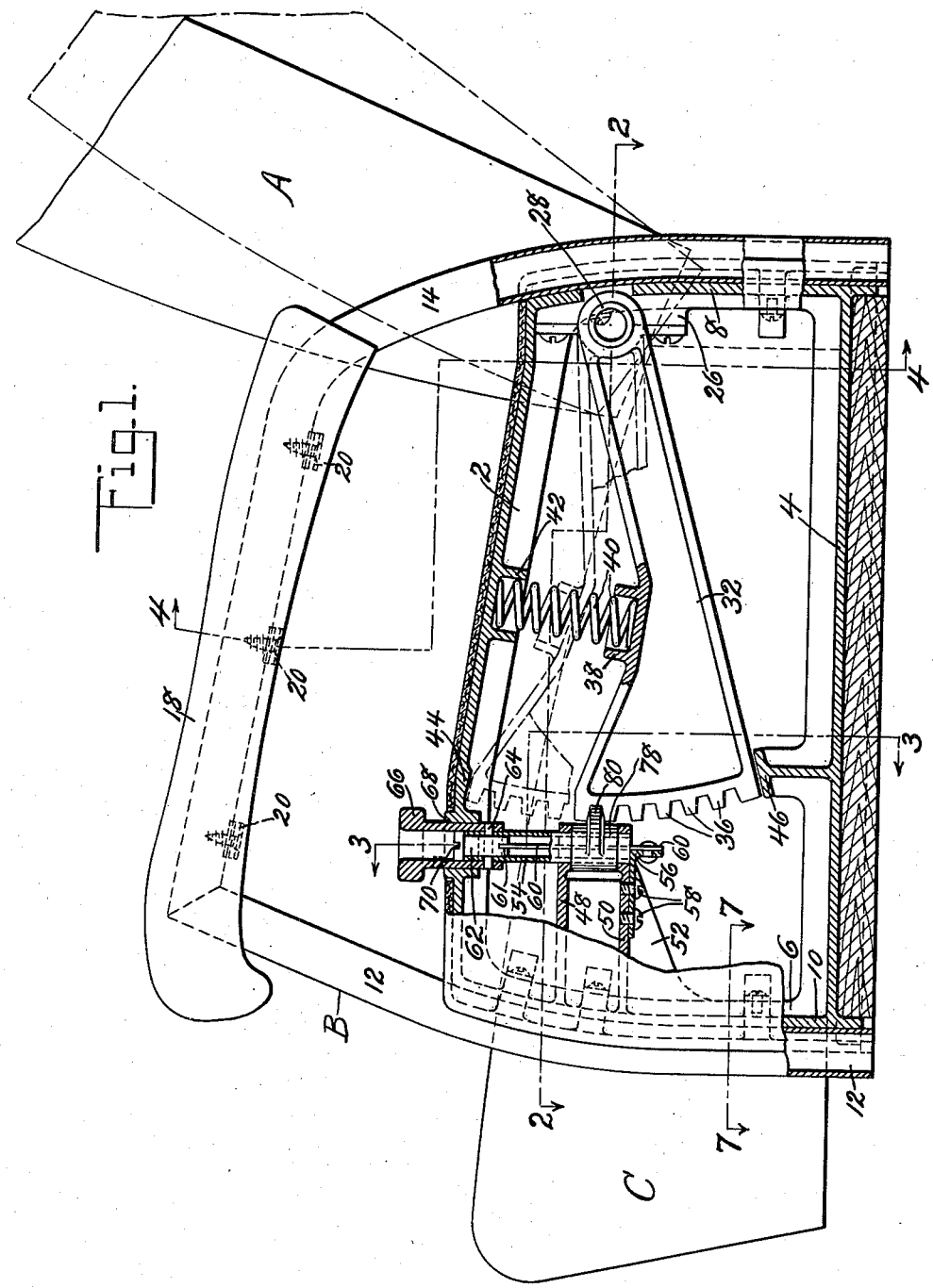
INVENTOR
John M. Knight
BY
ATTORNEY

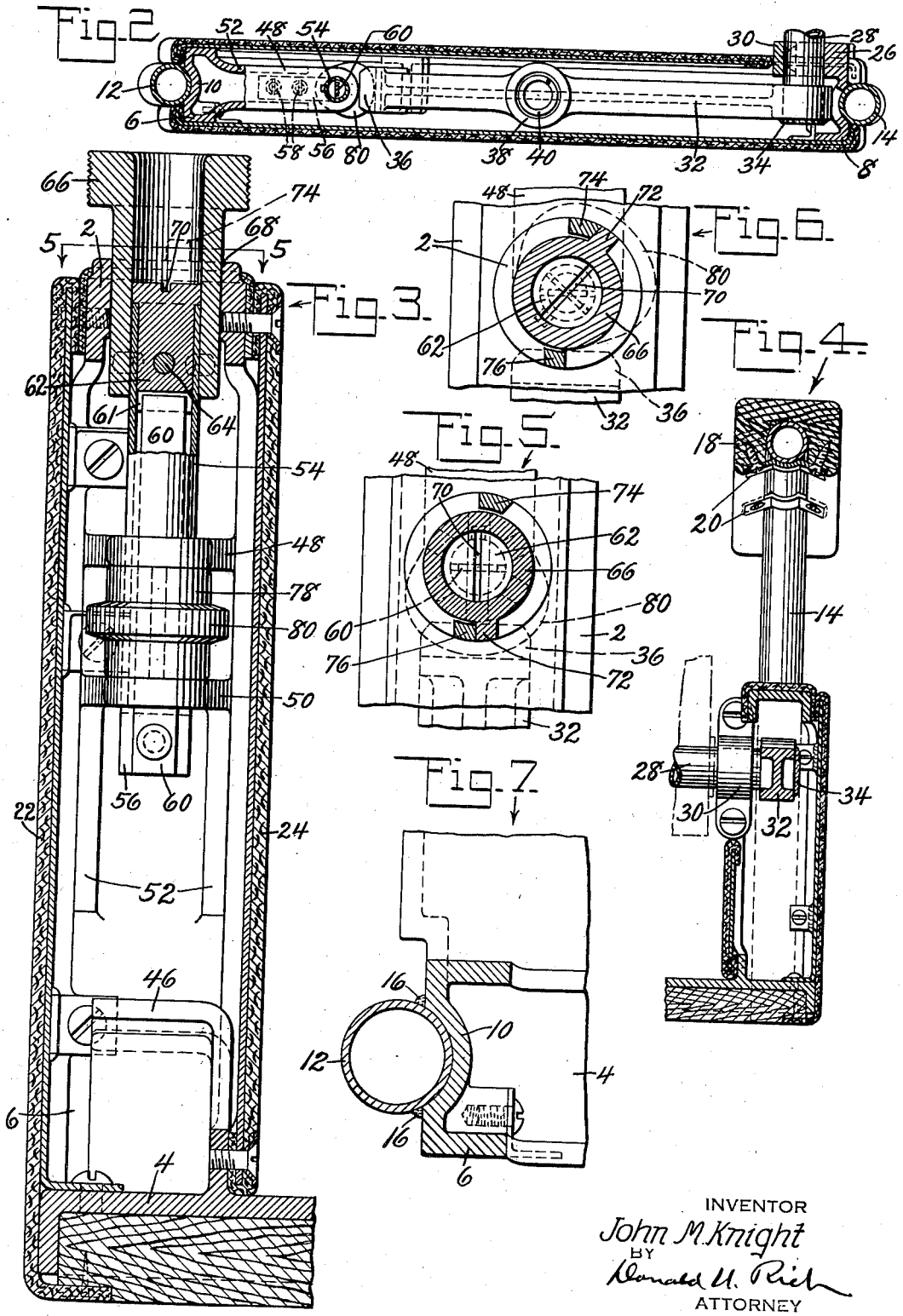

Patented Sept. 20, 1938

2,130,767

UNITED STATES PATENT OFFICE 2,130,767

RECLINING SEAT CONTROL MECHANISM

John M. Knight, Atlantic Highlands, N. J., assignor to American Car and Foundry Company, New York, N. Y., a corporation of New Jersey Application January 16, 1937, Serial No. 120,989

5 Claims. (Cl. 155—152)

This invention relates to reclining seats in general and in particular to reclining seats for use on vehicles of either road or rail type.

In reclining seats for use in all types of vehicles it is of prime importance that the control mechanism be very simple and rugged due to the fact that the seat will be operated by unskilled persons. It is also necessary that a minimum number of parts be used and that any connection between the various parts be made as tight as possible in order that the seat back or other parts will not vibrate during operation of the vehicle. It is an object, therefore, of the invention to provide a reclining seat having an extremely simple and rigid control mechanism.

Another object of the invention is the provision of a reclining seat mechanism wherein the seat back is substantially locked rigidly to the seat frame in its various positions.

A further object of the invention is the provision of a reclining seat mechanism wherein the reaction of the back is transferred substantially direct to the seat frame, thus eliminating possibility for lost motion.

These and other objects of the invention will be apparent to persons skilled in the art from a study of the following description and accompanying drawings, in which:

Figure 1 is an end view of the seat with portions thereof broken away to better disclose the mechanism;

Fig. 2 is a sectional view taken substantially on line 2—2 of Fig. 1;

Fig. 3 is a sectional view taken substantially on line 3—3 of Fig. 1;

Fig. 4 is a sectional view taken substantially on line 4—4 of Fig. 1;

Figs. 5 and 6 are sectional views taken substantially on line 5—5 of Fig. 3 and showing the locking member in locked and released positions respectively; and Fig. 7 is a sectional view taken substantially on line 7—7 of Fig. 1 and showing details of the end frame construction.

Referring now to the drawings in detail, it is seen that the seat consists of reclining back A, end frame B and conventional seat cushion C. The light weight end frame is formed with a lower substantially rectangular casting formed by top and bottom members 2 and 4 joined together by front and rear upright portions 6 and 8 respectively. These front and rear portions, as clearly shown in Figs. 2 and 7, are cast with the web portion 10 curved inwardly in order that tubes 12 and 14 may be rigidly secured thereto as by welding at 16. The tubes 12 and 14 extend upwardly beyond the frame and are joined to each other and provide a support for the arm rest 18 which is held in place by clips 20. The inner and outer surfaces of the cast lower portion are suitably drilled and tapped in order that the reenforced upholstery units 22 and 24 may be attached thereto.

The upright portion 8 of the cast frame is provided on its interior surface with integral bearing seat 26 adapted to receive tube or other means 28 which is rigidly secured to the seat back in any approved manner. The tube is retained in the bearing by bearing cap 30 and is extended outwardly beyond the bearing to receive operating arm 32 which is preferably welded to the tube as at 34. The operating arm is of I-beam cross section as clearly shown in Fig. 4 and has the end remote from the seat tube formed with teeth or other projections 36 which are arranged along the circumference of a circle having its center substantially coinciding with the center of the seat back tube. Intermediate its ends the upper flange of the operating arm is widened and provided with a spring cup 38 adapted to receive the lower end of compression spring 40, the upper end of which bears against top frame member 2 being held in position by integral spring cup 42. This spring is of such a strength as to apply force tending at all times to return the seat back to its normal upright position and, therefore, will be inserted in the cups under a slight initial compression. The upper frame member is provided with a bearing pad 44 limiting the upward movement of the operating arm, while the lower member of the frame is provided with suitable stop means 46 limiting the downward movement of the arm.

In order that the movements of the operating arm may be positively controlled a bracket is cast integral with the front member of the frame and is formed with substantially horizontal ribs 48 and 50, the edges of which are tied together and braced by gusset portions 52 formed integral with the seat frame. The horizontal ribs are formed at their outer ends with openings providing bearings for vertically positioned tube 54. The tube is rotatably mounted in these bearing openings formed in the ribs 48 and 50 and rests upon the angle member 56 which is secured to the lower horizontal rib by screws or other means 58. This tube supporting angle has secured at its outer edge the lower end of a torsional spring 60, the upper end of which engages in a slot 61 of rotatable adjusting plug 62. The upper end of the tube 54 is provided with a plurality of pairs of aligned holes through any pair of which pin 64 may be inserted and through a hole in the plug, thus non-rotatably locking the plug to the tube and providing suitable adjustment of the torsional spring. The pin 64 is of sufficient length as to provide end portions extending outward from the tube, and these end portions fit within a selected pair of holes provided in the lower end of operating knob 66 which is rotatably mounted in opening 68 formed in the upper frame member 2. The rim of the operating knob is suitably knurled to provide an anti-slip surface, while the central portion of the knob is made hollow in order that a screw driver or other means may be inserted into engagement with slot 70 formed in the upper end of the adjusting plug previously mentioned, thereby permitting shifting of the plug and insertion of the pin 64 in the desired pair of holes in the tube and knob. It is thus seen that an operating means or member 78 is provided rotatably mounted with respect to the frame and suitably supported therein.

The operating knob is provided with a stop member 72 adapted to have engagement with limiting projections 74 and 76 respectively formed on the upper surface of the seat frame upper member. These projections limit the rotational movement of the knob and therefore the entire operating member 78 to some amount less than 180° as is clearly shown by Figs. 5 and 6. In assembling the device the plug 62 will be so rotated as to cause the torsion spring to retain the stop 72 in engagement with the stop 76, that is, the torsion spring will be placed under a slight initial strain and any further movement of the knob by an operator will cause the spring to be placed under additional strain.

In order that this operating knob may control the movements of the operating arm, the lower end of the tube is suitably fastened in a locking member 78, which is of such a length as to closely fit between bracket ribs 48 and 50. The locking member is provided with an integral semi-circular projection 80 suitably tapered to engage between the teeth 36 of the operating arm. This projection may, if desired, be tapered slightly in order that it will constantly wedge between the teeth preventing any possible freedom of movement. This projection is intended to be in full engagement with the teeth when the stop 72 is against projection 76 and will be released from the teeth when the stop 72 is in engagement with projection 74.

Assuming the parts to be in the position shown by full lines in Figure 1, the operation of the device is as follows: The operator will by rotating the control knob in a counterclockwise direction cause the projection of the locking member to be swung clear of the teeth 36, after which application of pressure to the seat back will cause it to rotate backward about tube 28 to any desired position, after which release of the operating knob will permit the projection to be swung back into engagement with the teeth under action of the torsion spring. If the seat back is already inclined, it is only necessary to rotate the knob to the released position against the action of the torsion spring and the stored energy of the compression spring 40 will return the seat back to its normal position or any intermediate position desired.

It is thus seen that an extremely simple seat back control mechanism has been provided with only two points at which any lost motion may appear and both of these points may be easily and accurately machined to entirely eliminate any lost motion. The locking member and teeth of the operating arm may be formed of special steels or other hard wear-resisting material, thus minimizing the possibility of lost motion appearing during service.

While the device has been described in more or less detail, it is obvious that various modifications and rearrangements of parts may be made and all such modifications and rearrangements are contemplated as fall within the scope of the following claims.

What is claimed is:

1. In a reclining seat the combination of seat end frames, a cushion, a back pivotally mounted on the end frames and movable to reclining positions relative to the cushion by force imposed upon the back by an occupant, and a control mechanism comprising, an operating arm rigidly secured adjacent its rearward end to the back and arcuately movable in unison with the back in a substantially vertical plane, a plurality of projections formed on the forward end of the operating arm and adapted to control the reclining position of the back, a bracket integral with an end frame and formed with spaced apart ribs, a tubular locking member rotatably mounted between the spaced ribs and adjacent the forward end of the operating arm for rotation about an axis lying substantially in said vertical plane, said locking member being provided with a projection adapted to be rotated in a plane normal to the plane of movement of the operating arm into engagement with the projections on the arm to hold said arm against arcuate movement thereby securing the back against pivotal movement, an actuating member connected to the locking member for manually rotating the member to arm releasing position, and a torsion spring extending into said tubular locking member and connected to the end frame and actuating member for automatically returning the locking member to arm locking position upon release of the actuating member by the operator, said actuating member being located adjacent the cushion for operation by an occupant seated on the cushion.

2. In a reclining seat, the combination with a seat frame, a back pivoted upon the frame and movable to reclining position, an operating arm rigidly secured adjacent its rearward end to the back and arcuately movable in unison with the back in a vertical plane, a plurality of projections formed on the forward end of the operating arm, and locking means for said seat back including a tubular control member mounted for rotative movement in the frame, a projection carried by said control member for engagement between the projections on the forward end of the operating arm, a torsion spring positioned within the tubular member and fixed at one end to the frame, the opposite end of the torsion spring being secured to said tubular member, means for rotating said tubular member against the tension of the spring to disengage said projection from the control arm, and means for adjusting the tension of said torsion spring.

3. In a reclining seat, the combination with a seat frame, a back pivoted upon the frame and movable to reclining position, an operating arm rigidly secured adjacent its rearward end to the back and arcuately movable in unison with the back in a vertical plane, a plurality of projections formed on the forward end of the operating arm, and locking means for said seat back including a tubular control member rotatably mounted on the seat frame adjacent the forward end of the operating arm and provided with an arcuate projection adapted to rotate in a substantially horizontal plane into engagement with the projections on said operating arm, a plug adjustably secured in said tubular control member, a spring positioned within said tubular control member, means for securing one end of said spring to said frame, means for securing the opposite end of said spring to said plug, and means for locking said plug in adjusted position to vary the tension of said spring.

4. In a reclining seat, the combination with a seat frame, a back pivoted upon the frame and movable to reclining position, an operating arm rigidly secured adjacent its rearward end to the back and arcuately movable in unison with the back in a vertical plane, a plurality of projections formed on the forward end of the operating arm, and locking means for said seat back including a rotatable tubular control member mounted on the seat frame adjacent the forward end of said operating arm, a projection carried by said control member for engagement with the projections on said operating arm, a torsion spring fixed to said frame and extending into said tubular control member, a plug positioned in said control member and fixed to the upper end of said spring, an operating knob for said tubular control member, means for securing said plug and tubular member together and adjustably securing same in said operating knob, and stop means for limiting the rotary movement of said knob.

5. In a reclining seat, the combination with a seat frame, a back pivoted upon the frame and movable to reclining position, an operating arm rigidly secured adjacent its rearward end to the back and arcuately movable in unison with the back in a vertical plane, a plurality of projections formed on the forward end of the operating arm, and locking means for said seat back including a tubular control member rotatably mounted on the seat frame adjacent the forward end of the operating arm and provided with an arcuate projection adapted to rotate in a substantially horizontal plane into engagement with the projections on said arm, a spring fixed to said frame and extending into said tubular control member, a plug secured in said control member and fixed to the upper end of said spring, a knob enclosing the upper end of the tubular control member formed with a plurality of openings, a pin extending through the plug and engaging said knob openings to adjustably secure same together, and stop means for limiting the movement of said knob.

JOHN M. KNIGHT.